(12) United States Patent
Zhao et al.

(10) Patent No.: US 10,034,298 B2
(45) Date of Patent: Jul. 24, 2018

(54) TIME SLOT STATE UPDATE METHOD AND DEVICE

(71) Applicant: China Academy of Telecommunications Technology, Beijing (CN)

(72) Inventors: Li Zhao, Beijing (CN); Jiayi Fang, Beijing (CN); Yi Zhao, Beijing (CN); Feng Li, Beijing (CN); Yuan Feng, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 105 days.

(21) Appl. No.: 14/889,146

(22) PCT Filed: Dec. 27, 2013

(86) PCT No.: PCT/CN2013/090624
§ 371 (c)(1),
(2) Date: Nov. 5, 2015

(87) PCT Pub. No.: WO2014/180151
PCT Pub. Date: Nov. 13, 2014

(65) Prior Publication Data
US 2016/0113027 A1    Apr. 21, 2016

(30) Foreign Application Priority Data
May 9, 2013    (CN) .......................... 2013 1 0169747

(51) Int. Cl.
*H04L 1/00*    (2006.01)
*H04W 72/12*    (2009.01)
(Continued)

(52) U.S. Cl.
CPC ........... *H04W 72/12* (2013.01); *H04W 72/00* (2013.01); *H04W 74/006* (2013.01); *H04W 84/18* (2013.01); *H04W 88/181* (2013.01)

(58) Field of Classification Search
CPC . H04W 52/02; H04W 52/0203; H04W 72/04; H04W 72/12; H04W 76/00;
(Continued)

(56) References Cited

U.S. PATENT DOCUMENTS

2006/0140215 A1    6/2006    Fleming
2012/0163347 A1*   6/2012    Joo .................. H04W 72/0446
                                                      370/336

FOREIGN PATENT DOCUMENTS

CN    101421981 A    4/2009
CN    102413581 A    4/2012
(Continued)

OTHER PUBLICATIONS

Riccardo Scopigno et al: "Mobile Slotted Aloha for Vanets", Vehicular Technology Conference Fall (VTC—2009—Fall), 2009 IEEE 70th, IEEE, Piscataway, NJ, USA, Sep. 20, 2009 (Sep. 20, 2009), pp. 1-5, XP031600160, ISBN: 978-1-4244-2514-3.
(Continued)

*Primary Examiner* — Dady Chery
(74) *Attorney, Agent, or Firm* — Kilpatrick Townsend & Stockton LLP

(57) ABSTRACT

Embodiments of the present invention relate to the field of wireless communications. Disclosed are a time slot state update method and device, which are used to improve the time flexibility during update of the time slot state. In the present invention, a communications node determines an update period of a time slot state table, the update period comprising x continuous time slots and x being an integer not less than 1 and not greater than the total of the time slots
(Continued)

comprised in one frame; and the communications node updating the time slot state table after the update period ends. It can be seen that, the solution can improve the time flexibility during update of the time slot state.

14 Claims, 3 Drawing Sheets

(51) Int. Cl.
*H04W 72/00* (2009.01)
*H04W 88/18* (2009.01)
*H04W 74/00* (2009.01)
*H04W 84/18* (2009.01)

(58) Field of Classification Search
CPC ............. H04W 72/0446; H04B 7/2121; H04B 7/2123; H04B 7/2618; H04B 7/212; H04B 7/2643; H04J 2203/0069; H04Q 2213/394; H04Q 2213/13511; H04Q 2213/348

USPC ................. 370/311, 336, 329, 338, 347, 348
See application file for complete search history.

(56) References Cited

FOREIGN PATENT DOCUMENTS

| | | |
|---|---|---|
| CN | 102724764 A | 10/2012 |
| EP | 1915007 A1 | 4/2008 |
| JP | 2007274103 A | 10/2007 |

OTHER PUBLICATIONS

The Extended European Search Report dated Mar. 18, 2016 in the EP counterpart application (13884070.7).
International Search Report of PCT /CN20 13/090624.

* cited by examiner

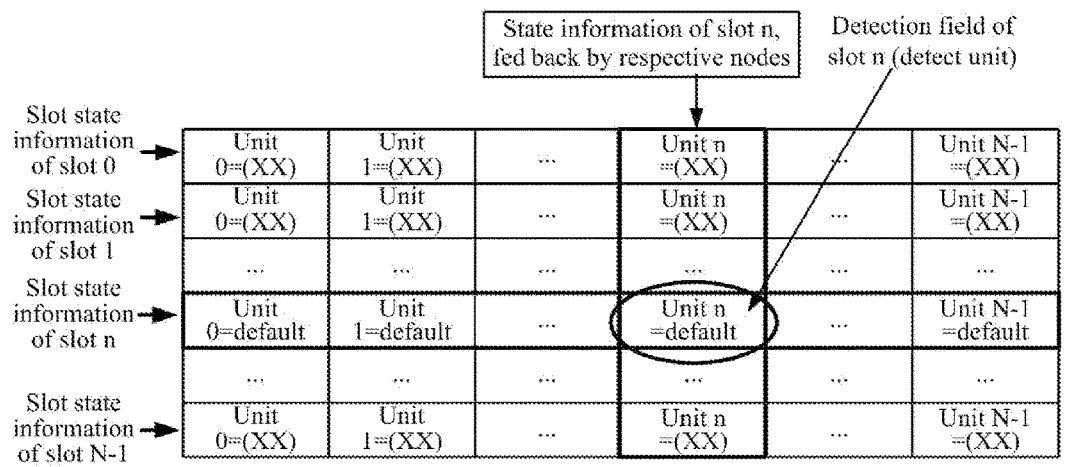
Fig.1
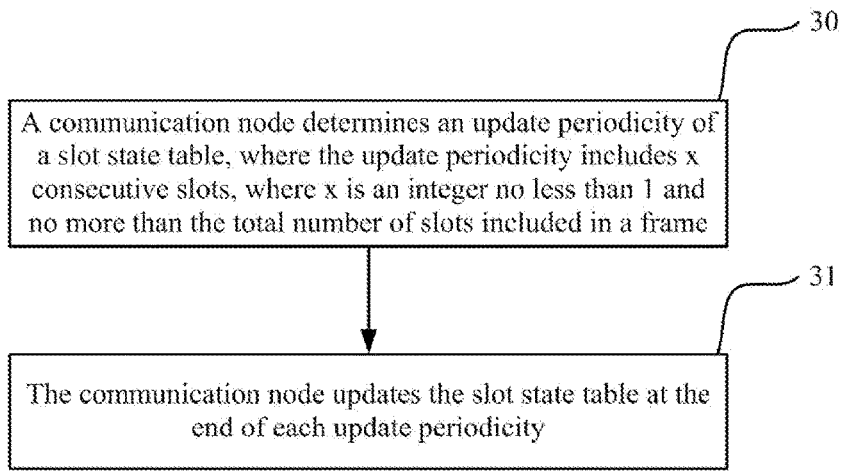
Fig.2
Fig.3

Fig.4a
Fig.4b
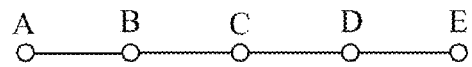
Fig.4c
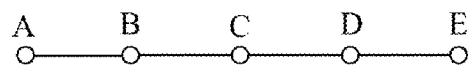
Fig.4d

TIME SLOT STATE UPDATE METHOD AND DEVICE

This application is a US National Stage of International Application No. PCT/CN2013/090624, filed on Dec. 27, 2013, designating the United States, and claiming the benefit of Chinese Patent Application No. 201310169747.5, filed with the State Intellectual Property Office of People's Republic of China on May 9, 2013 and entitled "Method and device for updating slot state", which is hereby incorporated by reference in its entirety.

FIELD

The present invention relates to the field of wireless communications and particularly to a method and device for updating the slot state.

BACKGROUND

In an existing Vehicle-to-X (V2X) communications system, nodes can exchange information with each other in a distributed manner to obtain information about occupancies of radio resources by the nodes, a topology between the nodes, and other information.

In an existing algorithm, e.g., the Mobile Slotted ALOHA (MS-ALOHA) algorithm, only received Frame Information (FI) is buffered in respective slots of each frame, and the received respective FI in a frame is processed collectively in a transmission slot. Even if there is collision occurring between slot resources before the transmission slot, the collision will not be detected until the instance of time of the transmission slot arrives, and may be detected on a late occasion. There may be a stressing burst peak processing load on the transmission slot.

In another existing algorithm, e.g., the State Update ALOHA (SU-ALOHA) algorithm, whether FI is received is determined in each slot of each frame. If FI is received, the slot state table will be updated, so that collision occurring between transmission slots can be detected timely to reselect an available transmission slot, and also smooth the stressing peak processing load on the transmission slot in the MS-ALOHA algorithm. However since the one-dimension slot state table is reset periodically, the one-dimension slot state table can not be processed according to integral Frame Information (FI) received in a frame, a multi-table processing result of the one-dimension slot state table can only be obtained with the effect of approaching the MS-ALOHA algorithm provided with the integral FI information, and it may not be necessary to process the slot state table in each slot if there is no collision occurring between slot resources.

A particular description will be given below:

The MS-ALOHA algorithm will be described taking a maintenance process as an example:

If FI is received in a slot n (0<=n<=N-1), then N information fields in the FI is filled into a row corresponding to the slot n in FIG. 1 (there are four status values of each information field, including an idle state, an occupied state, a collision state, and a two-hop occupied state, which are simply represented respectively as XX in FIG. 1); and if there is not any information received by a node in the slot n, then N columns of default states are filled into the row corresponding to the slot n in FIG. 1.

Here there are five possible states of any element, including the four states and the default state as mentioned above.

If a transmission slot is selected as a slot p, then respective slots are detected, and the old slot information in FIG. 1 is overwritten with new slot information (that is, information in latest N slots is kept in the window all the time), until the slot p arrives. If the slot p arrives, then for the (N−1) elements in the column corresponding to the slot p, it is determined using the N*N slot state buffer table whether there is such one or more occupied states (10) in the (N−1) elements that a Source Temporary Identifier (STI) thereof is different from the STI of the slot, and if so, then it is determined whether the priority of the slot is the highest, and if not, then a failure of occupying the slot is determined, and an idle slot needs to be reselected immediately as a transmission slot. Apparently the collision occurring between the slot resources will not be determined according to the information fields in the previously received FI until the slot p arrives, so the collision occurring between the slot resources may be determined on a late occasion.

The information in the N*N slot state buffer table needs to be monitored for the slot p, and the slot states in the column corresponding to the transmission slot p, in the (N−1)*N slot state buffer table need to be converted except for the corresponding row, where in the worst case, if every two information fields in each slot need to be compared with each other to obtain a final state conversion result, then the temporal complexity of processing the N slots will be O($n^3$), thus resulting in a pressing burst peak processing load on the transmission slot.

The SU-ALOHA algorithm will be described taking requesting for a new slot as an example:

A node occupies two slots and maintains two one-dimension state tables as illustrated in FIG. 2.

If the slot 7 is the expected new slot requested for in the slot 3, then since the one-dimension slot state table corresponding to the slot 2 has just been reset periodically in the slot 2, the information in the slot state table only includes information of transmission slot 2. The one-dimension slot state table corresponding to the slot 6 is reset periodically in the slot 6 in the last frame so that information of the slot 3, the slot 4 and the slot 5, received in the slot 3 is not integral. The information in the one-dimension slot state table corresponding to the slot 3, generated from the one-dimension slot state table corresponding to the slot 6 is not integral either.

In the processing of buffering the slot states in the one-dimension slot state table in each slot, since the compared information fields in the FI correspond to the slot state units in the one-dimension slot state table per slot, the temporal complexity of processing the N slots is O(n), thus smoothing the stressing peak processing load on the transmission slot in the MS-ALOHA algorithm.

In summary the prior art suffers from the following technical problems:

In the MS-ALOHA algorithm, respective FI received in a frame is processed collectively only in a transmission slot in the frame to update a slot state table, thus resulting in a stressing peak processing load on the transmission slot, where the temporal complexity of processing is O($n^3$); and in the SU-ALOHA algorithm, it may not be necessary to update the slot state table in each slot if there is no collision occurring between slot resources because the temporal complexity of processing would have become higher if the slot state table were updated in each slot. Apparently there may be low temporal flexibility in updating the slot states in the prior art.

SUMMARY

Embodiments of the invention provide a method and device for updating the slot state so as to improve the temporal flexibility in updating slot states.

A method for updating the slot state includes:

determining, by a communication node, an update periodicity of a slot state table, wherein the update periodicity includes x consecutive slots, wherein x is an integer no less than 1 and no more than the total number of slots included in a frame; and updating, by the communication node, the slot state table at the end of each update periodicity.

A communication device includes:

an update periodicity determining unit configured to determine an update periodicity of a slot state table, wherein the update periodicity includes x consecutive slots, wherein x is an integer no less than 1 and no more than the total number of slots included in a frame; and a state table updating unit configured to update the slot state table at the end of each update periodicity.

In summary, the invention has the following advantageous effects:

In the solutions according to the embodiments of the invention, the communication node determines the update periodicity of the slot state table, where the update periodicity includes x consecutive slots, where x is an integer no less than 1 and no more than the total number of slots included in a frame; and updates the slot state table at the end of each update periodicity. Apparently in these solutions, the update periodicity of the slot state table can be determined in real-time according to the current system service condition instead of updating the slot state table in each slot or updating the slot state table only in the transmission slot, to thereby improve the temporal flexibility of updating the slot state table.

BRIEF DESCRIPTION OF THE DRAWINGS

FIG. 1 is a schematic diagram of the N*N two-dimension slot state buffer table in the prior art;

FIG. 2 is a schematic diagram of the one-dimension slot state table maintained in the node for each slot occupied by the node in the multi-table solution in the prior art;

FIG. 3 is a schematic flow chart of a method according to an embodiment of the invention;

FIG. 4a is a schematic diagram of a one-dimension slot state table in the SU-ALOHA algorithm according to an embodiment of the invention;

FIG. 4b is a schematic diagram of an FI information buffer table according to an embodiment of the invention;

FIG. 4c is a schematic diagram of a node topology according to a first embodiment of the invention;

FIG. 4d is a schematic diagram of a node topology according to a third embodiment of the invention;

DETAILED DESCRIPTION OF THE EMBODIMENTS

Figure 4E:
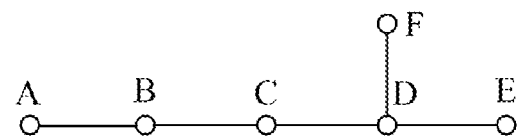
FIG. 4e is a schematic diagram of a node topology according to a fourth embodiment of the invention.

The ALOHA mechanism is a time-division based Dedicated Short Range Communication (DSRC) Medium Access Control (MAC) layer access and resource allocation mechanism, where resources are allocated per slot based on a frame structure. A frame includes N slots, and the slots in each frame are numbered 0 to N−1 cyclically across the frames. Only one vehicle is allowed to transmit in each slot, that is, the Time Division Multiple Access (TDMA) mode is applicable between the vehicles. The vehicle not only sends data of the application layer but also needs to send Frame Information (FI) in the slot occupied by the vehicle, where occupied states of respective slots in a frame are indicated in the FI.

A general idea of the cumulative state update mechanism (e.g., the MS-ALOHA mechanism) lies in that any node (e.g., a vehicle) joining a network needs to occupy a slot by detecting an idle slot resource in a frame, and if the node does not release the slot resource occupied by the node on its own initiative, then the node can transmit data in the occupied slot all the time, and none of other nodes can access the slot in this period of time. The node needs to send FI periodically in the occupied slot, where the FI carries conditions, obtained by the node, of occupancies of slots by the other nodes in a range of two hops from the node, to indicate occupancy state information of each slot recognized by the node, where the information about each slot includes: occupancy state information of the slot, a Source Temporary Identifier (STI), or a node identifier, corresponding to the node occupying the slot, and a priority of the node occupying the slot (or a priority corresponding to data sent by the node occupying the slot in the slot), where the occupancy state information of the slot can include four occupancy states of the slot: (00) indicating that the slot is in an idle state, (10) indicating that the slot is occupied by another node at a distance of one hop from the present node (simply a one-hop node) or the present node, (11) indicating that the slot is occupied by another node at a distance of two hops from the present node (simply a two-hop node), and (01) indicating that the slot is occupied by more than two other nodes, i.e., a collision state; and each node can detect FI sent by an adjacent one-hop node, in a slot which is not occupied by the each node to determine states of occupancies of slots by each node in an adjacent range of three hops, and if there is detected collision occurring between a slot resource occupied by the present node and a resource occupied by another node, then a new idle slot is reserved again. For the sake of a convenient description later, the FI and the information contents therein will be described throughout the context as follows:

Frame Information (FI) sent by a node will be referred to as an FI message or simply FI;

Occupancy state information corresponding to each slot indicated in the FI will be referred to as a slot information field corresponding to each slot in the FI message; and Three classes of information given in the occupancy condition information corresponding to each slot in the FI (i.e., a slot occupancy state, an STI, and priority information) will be referred to respectively as a slot occupancy state sub-unit, an STI sub-unit, and a priority sub-unit included in the slot information field of each slot.

It shall be noted that the description above has been given only for the sake of a convenient description later, but they can alternatively be described otherwise.

In the cumulative state update mechanism, the node needs to maintain the occupied slot by maintaining an (N−1)*N-dimension slot state buffer table to store the slot information fields of the respective slots carried in the FI messages, sent by the adjacent nodes, received in the corresponding slot. Referring to FIG. 1, for example, there is illustrated an N*N-dimension slot state buffer table, and since the FI message sent by the node in the occupied slot does not need to be stored, there are (N−1) rows in the slot state buffer table really maintained by the node (where it is assumed that only one slot is occupied by each node), and the (N−1)*N-dimension slot state buffer table described later will refer to a slot state buffer table in which no FI sent by the node in the occupied slot is stored; where a detection field corresponding to a slot refers to the slot information field corresponding to the slot, in the FI message sent in the occupied slot, which is referred to as a detection unit of the slot, and non-detection field refers to a slot information field corresponding to the slot, in the FI sent in another slot than the occupied slot, which is referred to as a non-detection unit of the slot. There is a default value.

The node receiving FI in a slot always overwrites the information contents in the row corresponding to the slot, in the slot state buffer table with slot information contents carried in the newly received FI (that is, overwrites the contents recorded in a last frame periodicity), particularly as follows:

The node needs to generate and send the FI in the slot occupied by the node, by filling into the respective fields under some rule, which include the slot occupancy state sub-unit, the STI sub-unit, and the priority sub-unit, and the node will empty the sent FI after all the FI is sent.

The node needs to receive FI sent by a surrounding node, in a slot which is not occupied by the node, updates the slot state buffer table with the received FI message, and determines whether the slot occupied by the node has been maintained successfully, and occupancy states of the respective slots which are not occupied by the node, before the slot occupied by the present node arrives. Where if no FI is received in the slot which is not occupied by the node, then the node will fill default values into the row corresponding to the slot, in the slot state buffer table. The default value is currently set as the idle state (00), or of course, it can alternatively be defined otherwise.

In order to improve the temporal flexibility of updating slot states, an embodiment of the invention provides a method for updating the slot state, which can be applicable to a vehicle-road coordination communication system.

Referring to FIG. 3, a method for updating the slot state according to an embodiment of the invention includes the following steps:

Operation 30: a communication node determines an update periodicity of a slot state table, where the update periodicity includes x consecutive slots, where x is an integer no less than 1 and no more than the total number of slots included in a frame; and the frame here refers to a combination of slot resources, or the frame can alternatively be embodied in anther form, e.g., sub-frames, hyper-frames, etc.

The slot as referred to in the embodiment of the invention can alternatively be a sub-frame.

Operation 31: the communication node updates the slot state table at the end of each update periodicity. The slot state buffer table here refers to an information table recording states of the respective slots obtained by the communication node from received FI under an internal Finite State Machine (FSM) processing rule. The communication node can particularly be a terminal, etc.

Each time the slot state table is updated, the communication node can detect collision between slots, that is, determine whether there is collision occurring between a slot occupied by the communication node and a slot occupied by another node, according to the updated slot state table, and if so, then the communication node restarts a channel access procedure to reserve a new slot resource.

The update periodicity of the slot state table may be kept invariable all the time, and at this time the communication node can determine the update periodicity of the slot state table according to configuration information of a system in the operation 30.

The update periodicity of the slot state table may alternatively be variable, and at this time the communication node can determine the update periodicity of the slot state table dynamically according to a current system service condition in the operation 30, and particularly the communication node can obtain at least one of current processing capacity information in each slot of the system, a buffer area size, service delay requirement information, and collision detection delay requirement information, and determine the update periodicity of the slot state table according to the obtained information.

For example, while the system is initialized, the communication node determines the update periodicity of the slot state table according to the current system service condition; and while the system is operating, the communication nodes determines the update periodicity of the slot state table once according to the current system service condition at an interval of time; or while the system is operating, the communication nodes determines the update periodicity of the slot state table once according to the current system service condition each time a preset trigger event occurs, where the trigger event can particularly includes: a low-delay service (i.e., a service with a service delay below a preset threshold) occurs, a high-delay service (i.e., a service with a service delay above the preset threshold) occurs, a collision detection delay requirement is changed, etc.

Here the processing capacity information in each slot of the system can include one or more of processor master frequency information, a multi-processor coordination processing capacity, and a typical process processing delay of a hardware platform; and the collision detection delay requirement is a delay requirement in detecting whether there is collision occurring between slot resources.

When the communication node determine the update periodicity of the slot state table according to the obtained information, if the obtained information includes the processing capacity information in each slot of the system, then the value of x can be determined under a principle that the value of x will be larger if the processing capacity in each slot of the system is higher, and the value of x will be smaller if the processing capacity in each slot of the system is lower; if the obtained information includes the buffer area size, then the value of x can be determined under a principle that the value of x will be smaller if the buffer area size is smaller, and the value of x will be larger if the buffer area size is larger; if the obtained information includes the service delay requirement information, then the value of x can be determined under a principle the value of x will be smaller if the service delay is smaller, and the value of x will be service delay if the service delay is larger; and if the obtained information includes the collision detection delay requirement, then the value of x can be determined under a principle that the value of x will be smaller if the collision detection delay is smaller, and the value of x will be larger if the collision detection delay is larger.

The method for determining the update periodicity of the slot state table will be described below by way of an example:

If the temporal length of a frame in the system is 100 ms, there are 100 slots in a frame, and the temporal length of each slot is 1 ms, then:

When the system is initialized, the fixedly configured x is determined as 50 according to the processing capacity (e.g., the CPU processing capacity, the buffer area size, etc.) of the hardware platform, and the typical service delay requirement;

If there is a low-delay service with a delay of 20 ms occurring while the system is operating, then x will be adjusted adaptively below 20 according to the service delay requirement; and If there is a high-delay service with a delay of 200 ms occurring while the system is operating, where the service is not sensitive to collision between slots, and the hardware platform can support a processing capacity at a larger value of x, then x will be adjusted adaptively above 100 and below 200.

The value of x can be adjusted adaptively given a support by the real platform so that if there is a smaller service delay and there is a smaller collision detection delay, then the value of x can be smaller; otherwise, the value of x can be larger.

In the operation 31, the slot state table can be updated at the end of each update periodicity particularly in the following three approaches:

In a first approach, the communication node buffers FI received in slots in each update periodicity, and information about the slots where the FI is located (i.e., the slots in which the FI is received); and The communication node inputs the respective FI received in the slots in each update periodicity, and the information about the slots where the FI is located to an iterative state update algorithm sequentially in the order that they are received, at the end of the update periodicity, and to update the slot state table in the iterative state update algorithm, that is, to update the slot state table once in the iterative state update algorithm each time a piece of FI, and information about a slot where the FI is located is input Particularly an FI information buffer table can be preset, where the FI information buffer table is initialized, i.e., emptied, at the beginning of each update periodicity, and the FI information buffer table includes x rows, each of which corresponds to one of slots in the update periodicity; and correspondingly the FI received in the slots in the update periodicity, and the information about the slots where the FI is located is buffered particularly as follows: after the FI is received in the slots in the update periodicity, the FI, and the information about the slots where the FI is located is stored into the rows corresponding to the slots, in the FI information buffer table, and particularly after FI is received in a slot in an update periodicity, a Mod operation is performed on a slot number of the slot, and if a result of the Mod operation is n, then the FI, and information about a slot where the FI is located is stored into the n-th row in the FI information buffer table, for example, if the slot number of the slot in which the FI is received is 52, and there are 10 slots in the update periodicity, where 52 mod 10=2, then the FI received in the slot with the slot number of 52, and the information about the slot in which the FI is located is stored into the second row in the FI information buffer table.

Particularly the iterative state update algorithm can be the SU-ALOHA algorithm, etc.

The iterative state update algorithm is an algorithm in which slot states are updated as follows: the communication node stores only a vector about current occupancy states of the respective slots, which is referred to as a slot state vector (table) (or referred to as a slot state table or represented in another form). The communication node receiving FI sent by another communication node updates the slot information units corresponding to the respective slots, in the locally stored slot state vector (table), according to the slot information fields corresponding to the respective slots, in the received latest FI to thereby maintain the slot information by maintaining the slot state vector (table). If the node needs to send the FI determined by the node, then the node will generate the FI to be sent, from the information in the stored slot state vector (table).

A state update process in the SU-ALOHA algorithm is as follows:

The communication node maintains therein a one-dimension slot state table including N information fields, each of which corresponds to one of the slots, as illustrated in FIG. 4a, where N represents the number of slots included in a frame. The contents in the information field corresponding to each slot include:

A slot occupancy state type field indicates state information for use in conversion between six slot states in the node: idle, occupied by the present node, occupied by a one-hop node (i.e., another node at a distance of one hop from the present node), occupied by a two-hop node (i.e., another node at a distance of two hops from the present node), occupied by a three-hop node (i.e., another node at a distance of three hops from the present node), and collision (that is, the slot is occupied by more than two other nodes);

A Source Temporary Identifier (STI) of the terminal occupying the corresponding slot indicates the STI of the node occupying the slot resource; and A Priority State Field (PSF) indicates priority information, i.e., a priority state corresponding to data sent by the node occupying the slot, in the slot.

After the FI is received in each slot, the slot states in the one-dimension slot state table are converted immediately according the received FI to update the states of the respective slots in the one-dimension slot state table.

In a second approach, a temporary slot state table is preset, where the temporary slot state table is initialized, i.e., emptied, at the beginning of each update periodicity; and after FI is received in a slot in each update periodicity, the FI, and information about the slot in which the FI is located is input to the iterative state update algorithm, and the temporary slot state table is updated in the iterative state update algorithm; and The communication node maps the current temporary slot state table to virtual FI under a preset mapping rule at the end of each update periodicity, inputs the virtual FI to the iterative state update algorithm, and updates the slot state table in the iterative state update algorithm.

The temporary slot state table is constructed the same as the slot state table in the iterative state update algorithm, and reference can be made to the description above of the one-dimension slot state table in the SU-ALOHA algorithm for the construct of the slot state table in the iterative state update algorithm.

Particularly the mapping rule above can include the following mapping relationships:

A slot state of being self-occupied (that is, the slot is occupied by the present communication node) in the temporary slot state table is mapped to a virtual FI slot state of being self-occupied in a non-detection unit;

A slot state of one-hop neighboring (that is, the slot is occupied by another node at a distance of one hop from the present communication node) in the temporary slot state table is mapped to a virtual FI slot state of being self-occupied in a detection unit;

A slot state of being two-hop neighboring (that is, the slot is occupied by another node at a distance of two hops from the present communication node) in the temporary slot state table is mapped to a virtual FI slot state of being self-occupied in a non-detection unit;

A slot state of being three-hop neighboring (that is, the slot is occupied by another node at a distance of three hops from the present communication node) in the temporary slot state table is mapped to a virtual FI slot state of being two-hop neighboring;

A slot state of being idle in the temporary slot state table is mapped to a virtual FI slot state of being idle; and A slot state of collision in the temporary slot state table is mapped to a virtual FI slot state of collision.

In a third approach, the communication node buffers FI received in slots in each update periodicity, and information about the slots where the FI is located; and The communication node combines the buffered respective FI received in the slots in each update periodicity into a piece of special FI under an FI combination rule in the cumulative state update algorithm at the end of the update periodicity; and inputs the special FI to the iterative state update algorithm, and updates the slot state table in the iterative state update algorithm.

The cumulative state update algorithm is an algorithm in which slot states are updated as follows: the communication node receives and stores FI sent by another communication node, in a slot occupied by the other communication node in a frame periodicity, and analyzes the FI stored in a frame to obtain slot state information of the respective slots.

The cumulative state update algorithm can be the MS-ALOHA algorithm, etc., and the FI combination rule in the MS-ALOHA algorithm is the FSM process in the MS-ALOHA algorithm.

The invention will be described below in connection with particular embodiments:

Since there is a gain in integrity of information due to the FI stored in the MS-ALOHA algorithm, and the burst peak processing load on the transmission slot is smoothed in the SU-ALOHA algorithm to thereby low the temporal complexity, this embodiment proposes the following solution:

(I) The FI is buffered at an interval of x slots:

1) A temporal interval of x slots is set as follows:

The value of x is determined as a function of a processing capacity in each slot, and a buffer size of the real platform; and a service delay requirement, a collision detection delay requirement, etc., in the system. The value of x ranges from 1, inclusive, to N−1, inclusive.

The value of x in the real system can be determined as follows:

It is configured fixedly according to a last evaluation result while the system is being initialized; and It is adjusted adaptively given a support by the real platform according to a service condition of the system while the system is operating, for example, if there is a short service delay, and there is a collision detection delay requirement as short as possible, then the value of x will be small; and otherwise, the value of x will be large.

2) A new FI information buffer table is set:

If there are N slots in a frame, then the node needs to store FI received in an interval of x slots, by setting the FI information buffer table, and buffering FI messages received in each interval (x slots) respectively into the FI information buffer table. The FI information buffer table includes x rows corresponding to the stored FI information as illustrated in FIG. 4b.

(II) The FI information is buffered after x slots:

This can be done in the following three approaches:

In a first approach, x pieces of FI are buffered, the FSM is updated by inputting one of the pieces FI to the slot state table at a time.

The FI information buffer table is initialized at the beginning of the x slots;

The FI received in the x slots is buffered in the FI information buffer table, and the collected buffered FI is input sequentially to the slot state table for a FSM process on the received FI at the end of the x slots, where the FSM process is the same as in the SU-ALOHA algorithm; and The FI information buffer table is initialized at the end of the process.

In a second approach, x pieces of FI are buffered, the buffered FI is input to the FSM and then processed into a temporary slot state table, and next the temporary slot state table is input to the slot state table to update the FSM.

A temporary slot state table is newly created, and is initialized at the beginning of x slots;

FI, received in the x slots, buffered in the FI information buffer table is input sequentially to the temporary slot state table for a FSM process at the end of the x slots, where the FSM process is the same as in the SU-ALOHA algorithm; and The temporary slot state table is mapped to virtual FI: since the FSM in the existing SU-ALOHA algorithm takes the contents in the FI information fields as a trigger condition for state transferring process, the state information maintained in the node, in the temporary slot state table will be mapped to FI transmission slot indication information; and as compared with the first approach, a FSM process is additionally introduced, so the process of mapping to the virtual FI information is actually a fallback of the FSM process according to the determined result of the process of the temporary slot state table, where the FSM infers the content of such an information field among the respective columns of information fields for the x rows of buffered FI information that is of importance to conversion of the states in the temporary slot state table. The contents of the information field are filled into the information field of the virtual FI.

A table of mapping the slot states in the temporary slot state table to the slot states of the virtual FI is as depicted in Table 1 below:

TABLE 1

| Slot states in temporary slot state table | Slot states of mapped-to virtual FI | Comments on modification |
| --- | --- | --- |
| Self-occupied | 10 (non-detection unit) + Own STI and priority | The FI information buffer table includes the received FI, so the virtual FI necessarily includes the information in the non-detection unit |
| One-hop neighboring | 10 (detection unit) + Maintained STI and priority | There is a fallback of one-hop neighboring information, so the FI information field is achieved |

TABLE 1-continued

| Slot states in temporary slot state table | Slot states of mapped-to virtual FI | Comments on modification |
|---|---|---|
| Two-hop neighboring | 10 + (non-detection unit) Maintained STI and priority | There is a fallback of two-hop neighboring information, so the FI information field is achieved |
| Three-hop neighboring | 11 + Maintained STI and priority | There is a fallback of three-hop neighboring information, so the FI information field is achieved |
| Idle | 00 (STI and priority field are set default) | No modification |
| Collision | 01 + Maintained STI and priority | No modification |

The virtual FI information is input to the FSM, and the updated slot state table is obtained; and The FI information buffer table is initialized after the process.

In a third approach, x pieces of FI are buffered and processed into a piece of special FI, and the special FI is input to the slot state table for update.

Such a piece of special FI is newly created that is characterized in that the FI may include a number of detection units, and the special FI is initialized at the beginning of the x slots;

The FI information, received in the x slots, buffered in the FI information buffer table is processed into a piece of special FI under the FI combination rule in the MS-ALOHA algorithm at the end of the x slots, where the special FI may include a number of detection units;

The special FI is input into the slot state table for a FSM process, where the FSM process is the same as in the SU-ALOHA algorithm; and The FI information buffer table is initialized after the process.

The following embodiments will be presented with reference to the disclosure above:

First Embodiment

This embodiment corresponds to the first approach where x pieces of FI are buffered, one of the pieces of FI is input at a time to update the slot state table.

1) It is assumed that:

There are five slots in a frame, and there are five nodes connected in series in a stable and invariable topology as illustrated in FIG. 4c.

If the nodes A to E occupy the respective slots 1 to 5 in a frame respectively, then the FI sent by the respective nodes is depicted in Table 2 below:

TABLE 2

| A: 10 (detection unit) | B: 10 | C: 11 | X: 00 | X: 00 |
|---|---|---|---|---|
| A: 10 | B: 10 (detection unit) | C: 10 | D: 11 | X: 00 |
| A: 11 | B: 10 | C: 10 (detection unit) | D: 10 | E: 11 |

TABLE 2-continued

| X: 00 | B: 11 | C: 10 | D: 10 (detection unit) | E: 10 |
|---|---|---|---|---|
| X: 00 | X: 00 | C: 11 | D: 10 | E: 10 (detection unit) |

It is assumed that x=2 pieces of FI are buffered at a time.

2) Taking the node C as an example, the process flow is as follows:

In the slot 3:

The slot state table is reset after C sends the FI, where particular information in the table is as depicted in Table 3 below:

TABLE 3

| X: 00 | X: 00 | C: Self-occupied | X: 00 | X: 00 |
|---|---|---|---|---|

In the slot 4 and the slot 5:

The FI information buffer table is set to buffer the received FI, as depicted in Table 4 below, where the buffered FI is collected in the slot 5 and then processed collectively:

TABLE 4

| X: 00 | B: 11 | C: 10 | D: 10 | E: 10 |
|---|---|---|---|---|
| X: 00 | X: 00 | X: 00 | X: 00 | X: 00 |

Since the FI message of the node D is received only in the slot 4, and the FI message of the node E can not be received in the slot 5, the received FI which is input sequentially by the FSM is processed at the end of the slot 5, where the information in the slot state table of the node C at the end of the slot 5 is as depicted in Table 5 below, and the FSM process and the result thereof are the same as in the SU-ALOHA algorithm:

TABLE 5

| X: 00 | X: Three-hop neighboring | C: Self-occupied | D: One-hop neighboring | E: Two-hop neighboring |
|---|---|---|---|---|

The FI information buffer table is initialized after the process;

In the slot 1 and the slot 2:

The node C can not receive the FI sent by the node A, but receives the FI sent by the node B in the slot 2, as depicted in Table 6 below:

TABLE 6

| X: 00 | X: 00 | X: 00 | X: 00 | X: 00 |
|---|---|---|---|---|
| A: 10 | B: 10 | C: 10 | D: 11 | X: 00 |

The slot state table is processed as Table 7 below at the end of the slot 2:

TABLE 7

| A: 11 | B: One-hop neighboring | C: Self-occupied | D: One-hop neighboring | E: Two-hop neighboring |
|---|---|---|---|---|

The slot state table becomes correct after the integral FI in a frame is received and processed.

Second Embodiment

This embodiment corresponds to the second approach where x pieces of FI are buffered and processed by the FSM into a temporary slot state table, and then the slot state table is updated.

1) It is assumed that topology information of the nodes and occupancy information of slot resources is the same as in the first embodiment, and x=2 pieces of FI is buffered at a time.

2) Taking the node C as an example, the process flow is as follows:

In the slot 3:

The slot state table is reset after C sends the FI, where particular information in the slot state table is as depicted in Table 8 below:

TABLE 8

| X: 00 | X: 00 | C: Self-occupied | X: 00 | X: 00 |
|---|---|---|---|---|

In the slot 4 and the slot 5:

The FI is buffered, and the buffered FI is collected in the slot 5 (as depicted in Table 9 below) and then processed collectively:

TABLE 9

| X: 00 | B: 11 | C: 10 | D: 10 | E: 10 |
|---|---|---|---|---|
| X: 00 | X: 00 | X: 00 | X: 00 | X: 00 |

Since the FI of the node D is received only in the slot 4, and the FI of the node E can not be received in the slot 5, at the end of the slot 5, firstly the temporary slot state table is reset and the information of the self-occupied slot is kept; and thereafter the FI in the FI information buffer table is input to the temporary slot state table for a FSM process, and the obtained temporary slot state table is as depicted in Table 10 below:

TABLE 10

| Temporary slot state table | X: 00 | X: Three-hop neighboring | C: Self-occupied | D: One-hop neighboring | E: Two-hop neighboring |
|---|---|---|---|---|---|

Since the FSM in the existing SU-ALOHA algorithm takes the contents in the FI information fields as a trigger condition for the state transferring process, the state information maintained in the node, in the temporary slot state table will be mapped to FI transmission slot indication information; and as compared with the first approach, a FSM process is additionally introduced, so the process of mapping to the virtual FI information is actually a fallback of the FSM process according to the determined result of the process of the temporary slot state table, where the FSM infers the content of such an information field among the respective columns of information fields for the x rows of buffered FI information that is of importance to conversion of the states in the temporary slot state table, and the contents of the information field are filled into the information field of the virtual FI.

The states of the respective slots in Table 10 are mapped to the slot states of the virtual FI according to Table 1, and the obtained virtual FI is as depicted in Table 11 below:

TABLE 11

| Virtual FI information mapped from Temporary slot state table | X: 00 | B: 11 | C: 10 (non-detection unit) | D: 10 (detection unit) | E: 10 (non-detection unit) |
|---|---|---|---|---|---|

The virtual FI information is input to the FSM, and the information in the slot state table of the node C is obtained as depicted in Table 12 below:

TABLE 12

| X: 00 | X: Three-hop neighboring | C: Self-occupied | D: One-hop neighboring | E: Two-hop neighboring |
|---|---|---|---|---|

The FI information buffer table is initialized after the process;

In the slot 1 and the slot 2:

The node C can not receive the FI sent by the node A, but receives the FI sent by the node B in the slot 2, as depicted in Table 13 below:

TABLE 13

| X: 00 | X: 00 | X: 00 | X: 00 | X: 00 |
|---|---|---|---|---|
| A: 10 | B: 10 | C: 10 | D: 11 | X: 00 |

At the end of the slot 5, firstly the temporary slot state table is reset to keep the information about the self-occupied slot; and thereafter the FI in the FI information buffer table is input to the temporary slot state table for a FSM process, and the obtained temporary slot state table is as depicted in Table 14 below:

TABLE 14

| Temporary slot state table | A: Two-hop neighboring | B: One-hop neighboring | C: Self-occupied | D: Two-hop neighboring | X: 00 |
|---|---|---|---|---|---|

The states of the respective slots in Table 14 are mapped to the slot states of the virtual FI according to Table 1, and the obtained virtual FI is as depicted in Table 15 below:

TABLE 15

| Virtual FI information mapped from Temporary slot state table | A: 10 (non-detection unit) | B: 10 (detection unit) | C: 10 (non-detection unit) | D: 10 (non-detection unit) | X: 00 |
|---|---|---|---|---|---|

The virtual FI information is input to the FSM, and the information in the slot state table of the node C is obtained as depicted in Table 16 below:

TABLE 16

| A: Two-hop neighboring | B: One-hop neighboring | C: Self-occupied | D: One-hop neighboring | E: Two-hop neighboring |
|---|---|---|---|---|

The slot state table becomes correct after the integral FI information in a frame is received and processed.

Third Embodiment

This embodiment corresponds to the third approach where x pieces of FI are buffered and processed into a piece of special FI, and the special FI is input to the slot state table for update.

1) It is assumed that:

There are five slots in a frame, and there are five nodes connected in series in a stable and invariable topology as illustrated in FIG. 4d.

If the nodes A to E occupy the respective slots in a frame respectively, then the FI sent by the respective nodes is as depicted in Table 17 below:

TABLE 17

| A: 10 (detection unit) | X: 00 | C: 11 | X: 00 | B: 10 |
|---|---|---|---|---|
| X: 00 | E: 10 (detection unit) | C: 11 | D: 10 | X: 00 |
| A: 11 | E: 11 | C: 10 (detection unit) | D: 10 | B: 10 |
| X: 00 | E: 10 | C: 10 | D: 10 (detection unit) | B: 11 |
| A: 10 | X: 00 | C: 10 | D: 11 | B: 10 (detection unit) |

It is assumed that the received buffered FI is processed into a piece of special FI once at the end of x=2 slots.

2) Taking the node C as an example, the process flow is as follows:

In the slot 3:

The slot state table is reset after C sends the FI, where particular information in the slot state table is as depicted in Table 18 below:

TABLE 18

| X: 00 | X: 00 | C: Self-occupied | X: 00 | X: 00 |
|---|---|---|---|---|

In the slot 4 and the slot 5:

The FI is buffered, and the buffered FI is collected in the slot 5 (as depicted in Table 19) and then processed collectively:

TABLE 19

| X: 00 | E: 10 | C: 10 | D: 10 (detection unit) | B: 11 |
|---|---|---|---|---|
| A: 10 | X: 00 | C: 10 | D: 11 | B: 10 (detection unit) |

Since the FI of the node D is received in the slot 4, and the FI of the node B is received in the slot 5, firstly the received x=2 pieces of FI is combined into a piece of special FI at the end of the slot 5 under such a combination rule that the states with an influence upon the resulting FI are recorded (which is actually the FI combination rule in the MS-ALOHA algorithm but will not be limited to any particular number of detection units).

The obtained special FI is as depicted in Table 20 below:

TABLE 20

| A: 10 | E: 10 | C: 10 | D: 10 (detection unit) | B: 10 (detection unit) |
|---|---|---|---|---|

Apparently the special FI is characterized in that it includes a number of detection units, and the special FI is obtained by combining a number of pieces of FI received in respective slots in an update periodicity, where the detection units in the special FI are determined by the detection units in the pieces of FI, that is, if a piece of information field is a detection unit in some one of the pieces of FI, then the information field is also a detection unit in the special FI obtained as a result of combination.

The special FI information is input to the FSM, and the information in the slot state table of the node C is obtained as depicted in Table 21 below:

TABLE 21

| A: Two-hop neighboring | E: Two-hop neighboring | C: Self-occupied | D: One-hop neighboring | B: One-hop neighboring |
|---|---|---|---|---|

The FI information buffer table is initialized after the process;

In the slot 1 and the slot 2:

The node C can not receive the FI sent by the node A, and can not receive the FI sent by the node E in the slot 2, as depicted in Table 22 below:

TABLE 22

| X: 00 | X: 00 | X: 00 | X: 00 | X: 00 |
|---|---|---|---|---|
| X: 00 | X: 00 | X: 00 | X: 00 | X: 00 |

The special FI is obtained from the received FI as depicted in Table 23 below:

TABLE 23

| X: 00 | X: 00 | X: 00 | X: 00 | X: 00 |
|---|---|---|---|---|

The special FI is input to the FSM, and the information in the slot state table of the node C is obtained as depicted in Table 24 below:

TABLE 24

| A: Two-hop neighboring | B: One-hop neighboring | C: Self-occupied | D: One-hop neighboring | E: Two-hop neighboring |
|---|---|---|---|---|

The slot state table becomes correct after the integral FI in a frame is received and processed.

Fourth Embodiment

This embodiment corresponds to the third approach where x pieces of FI are buffered and processed into a piece of special FI, and the special FI is input to the slot state table for update, where a condition of collision between slot resources can be detected before a transmission slot.

1) It is assumed that:

A node F newly joins in addition to the nodes in the third embodiment as illustrated in FIG. 4e.

Information about occupancies of slots by the nodes A to E is the same as in the third embodiment, and the node F occupies the same slot 3 as the slot occupied by the node C, where the priority of F is higher than the priority of C.

It is assumed that the received buffered FI is processed into a piece of special FI once at the end of x=2 slots.

2) Taking the node C as an example, the process flow is as follows:

In the slot 3:

The slot state table is reset after C sends the FI, where particular information in the table is as depicted in Table 25 below:

TABLE 25

| X: 00 | X: 00 | C: Self-occupied | X: 00 | X: 00 |

In the slot 4 and the slot 5:

The FI is buffered, and the buffered FI is collected in the slot 5 (as depicted in Table 26 below) and then processed collectively:

TABLE 26

| X: 00 | E: 10 | F: 10 | D: 10 (detection unit) | B: 11 |
| A: 10 | X: 00 | C: 10 | D: 11 | B: 10 (detection unit) |

Since the FI of the node D is received in the slot 4, and the FI of the node B is received in the slot 5, firstly the received x=2 pieces of FI is combined into a piece of special FI at the end of the slot 5 under such a combination rule that the states with an influence upon the resulting FI are recorded, and the special FI is characterized in it includes a number of detection units and the information of the detection units are identified as per slot.

The special FI is obtained from the received FI as depicted in Table 27 below:

TABLE 27

| A: 10 | E: 10 | F: 10 | D: 10 (detection unit) | B: 10 (detection unit) |

Then the node C detects that the slot 3 occupied by the present node is occupied by the node F, so there is collision occurring between the slot resources, and a transmission slot needs to be reselected in a flow of handling collision.

As can be apparent from the flow in the fourth embodiment, collision can be detected in the invention on such an occasion that is the end of a period of time including an integer multiple of x slots, which is earlier by one frame than the transmission slot in each frame in the MS-ALOHA algorithm; and which includes an additional judgment delay of (x−1) slots relative to the SU-ALOHA algorithm, but only needs x temporal granularities for processing, thus alleviating the load of a FSM process on the slot state table in each slot.

Figure 5:
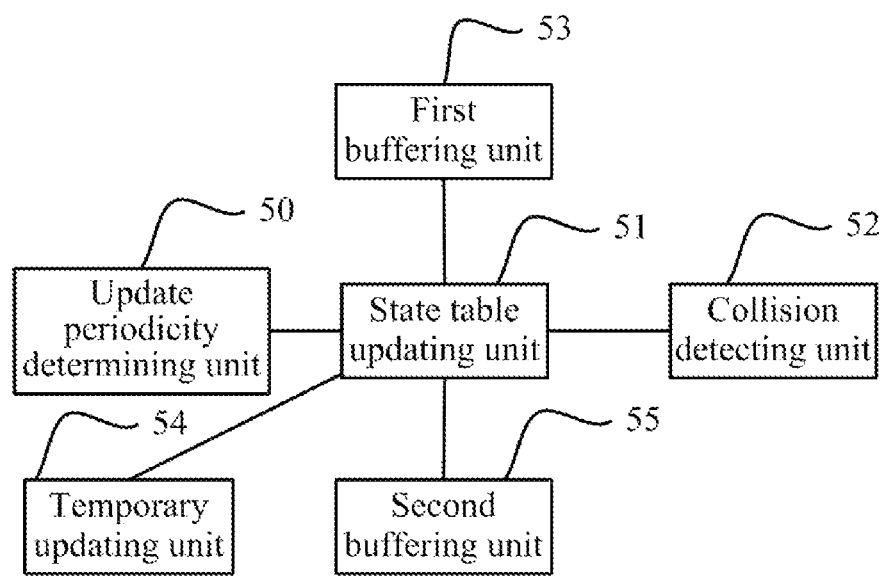
FIG. 5 is a schematic structural diagram of a communication device according to an embodiment of the invention.

Referring to FIG. 5, an embodiment of the invention provides a communication device including:

An update periodicity determining unit 50 is configured to determine an update periodicity of a slot state table, where the update periodicity includes x consecutive slots, where x is an integer no less than 1 and no more than the total number of slots included in a frame; and A state table updating unit 51 is configured to update the slot state table at the end of each update periodicity.

Furthermore the communication device further includes:

A collision detecting unit 52 is configured to detect collision between slots after the slot state table is updated at the end of each update periodicity.

Furthermore the update periodicity determining unit 50 is configured:

To determine the update periodicity of the slot state table according to configuration information of a system; or To obtain at least one of current processing capacity information in each slot of the system, a buffer area size, service delay requirement information, and collision detection delay requirement information, and to determine the update periodicity of the slot state table according to the obtained information Furthermore the communication device further includes:

A first buffering unit 53 is configured to buffer Frame Information (FI) received in the slots in each update periodicity, and information about the slots where the FI is located; and The state table updating unit 51 is configured:

To input the respective FI received in the slots in each update periodicity, and the information about the slots where the FI is located to an iterative state update algorithm sequentially in the order that they are received, at the end of the update periodicity, and to update the slot state table in the iterative state update algorithm.

Furthermore the communication device further includes:

A temporary updating unit 54 is configured to initialize a preset temporary slot state table at the beginning of each update periodicity; and to receive FI in the slots in each update periodicity, to input the FI, and information about the slots where the FI is located to an iterative state update algorithm, and to update the temporary slot state table in the iterative state update algorithm; and The state table updating unit 51 is configured: to map the current temporary slot state table to virtual FI under a preset mapping rule at the end of each update periodicity, to input the virtual FI to an iterative state update algorithm, and to update the slot state table in the iterative state update algorithm.

Furthermore the mapping rule includes:

A slot state of being self-occupied in the temporary slot state table is mapped to a virtual FI slot state of being self-occupied in a non-detection unit;

A slot state of being one-hop neighboring in the temporary slot state table is mapped to a virtual FI slot state of being self-occupied in a detection unit;

A slot state of being two-hop neighboring in the temporary slot state table is mapped to a virtual FI slot state of being self-occupied in a non-detection unit;

A slot state of being three-hop neighboring in the temporary slot state table is mapped to a virtual FI slot state of being two-hop neighboring;

A slot state of being idle in the temporary slot state table is mapped to a virtual FI slot state of being idle; and A slot state of collision in the temporary slot state table is mapped to a virtual FI slot state of collision.

Furthermore the communication device further includes:

A second buffering unit 55 is configured to buffer FI received in the slots in each update periodicity, and information about the slots where the FI is located; and The state table updating unit 51 is configured:

To combine the buffered respective FI received in the slots in each update periodicity into a piece of special FI under an FI combination rule in a cumulative state update algorithm at the end of the update periodicity; and To input the special FI to an iterative state update algorithm, and to update the slot state table in the iterative state update algorithm.

Figure 6:
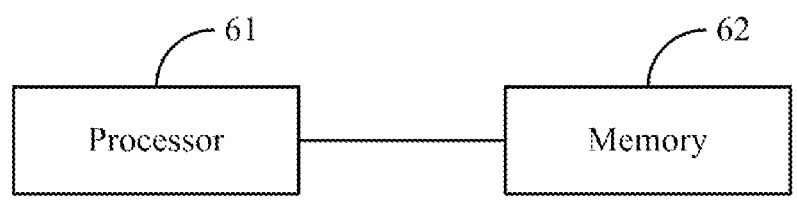
FIG. 6 is a schematic structural diagram of another communication device according to an embodiment of the invention.

Referring to FIG. 6, an embodiment of the invention provides another communication device including a processor 61 and a memory 62, where the processor 61 is configured with a computer program to perform the method above to perform corresponding functions, and the memory 62 stores codes of the computer program to configure the processor 61. Particularly:

The processor 61 is configured to determine an update periodicity of a slot state table, where the update periodicity includes x consecutive slots, where x is an integer no less than 1 and no more than the total number of slots included in a frame; and to update the slot state table at the end of each update periodicity.

Furthermore the processor 61 is configured to detect collision between slots after the slot state table is updated at the end of each update periodicity.

Furthermore the processor 61 is configured to determine the update periodicity of the slot state table according to configuration information of a system; or to obtain at least one of current processing capacity information in each slot of the system, a buffer area size, service delay requirement information, and collision detection delay requirement information, and to determine the update periodicity of the slot state table according to the obtained information Furthermore the memory 62 is configured to buffer Frame Information (FI) received in the slots in each update periodicity, and information about the slots where the FI is located; and The processor 61 is configured to input the respective FI received in the slots in each update periodicity, and the information about the slots where the FI is located to an iterative state update algorithm sequentially in the order that they are received, at the end of the update periodicity, and to update the slot state table in the iterative state update algorithm.

Furthermore the processor 61 is configured to initialize a preset temporary slot state table at the beginning of each update periodicity; and to receive FI in the slots in each update periodicity, to input the FI, and information about the slots where the FI is located to an iterative state update algorithm, and to update the temporary slot state table in the iterative state update algorithm; and The processor 61 is configured to map the current temporary slot state table to virtual FI under a preset mapping rule at the end of each update periodicity, to input the virtual FI to an iterative state update algorithm, and to update the slot state table in the iterative state update algorithm.

Furthermore the mapping rule includes:

A slot state of being self-occupied in the temporary slot state table is mapped to a virtual FI slot state of being self-occupied in a non-detection unit;

A slot state of being one-hop neighboring in the temporary slot state table is mapped to a virtual FI slot state of being self-occupied in a detection unit;

A slot state of being two-hop neighboring in the temporary slot state table is mapped to a virtual FI slot state of being self-occupied in a non-detection unit;

A slot state of being three-hop neighboring in the temporary slot state table is mapped to a virtual FI slot state of being two-hop neighboring;

A slot state of being idle in the temporary slot state table is mapped to a virtual FI slot state of being idle; and A slot state of collision in the temporary slot state table is mapped to a virtual FI slot state of collision.

Furthermore the memory 62 is configured to buffer FI received in the slots in each update periodicity, and information about the slots where the FI is located; and The processor 61 is configured to combine the buffered respective FI received in the slots in each update periodicity into a piece of special FI under an FI combination rule in a cumulative state update algorithm at the end of the update periodicity; and to input the special FI to an iterative state update algorithm, and to update the slot state table in the iterative state update algorithm.

In summary, the invention has the following advantageous effects:

In the solutions according to the embodiments of the invention, the communication node determines the update periodicity of the slot state table, where the update periodicity includes x consecutive slots, where x is an integer no less than 1 and no more than the total number of slots included in a frame; and updates the slot state table at the end of each update periodicity. Apparently in these solutions, the update periodicity of the slot state table can be determined in real-time according to the current system service condition instead of updating the slot state table in each slot or updating the slot state table only in the transmission slot, to thereby improve the temporal flexibility of updating the slot state table.

Furthermore in the solutions, The value of x can be less than N to avoid the stressing burst peak processing load on the transmission slot because the slot state table is updated only in the transmission slot in each frame, to thereby reasonably smooth the complexity of processing in the slots and lower the stressing burst peak processing load; and the value of x can be adjusted to reasonably set the temporal granularity at which collision between slots is detected.

In the solutions, no N*N slot state buffer table will be stored, thus saving a memory space.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for updating slot state, the method comprising:
   determining, by a communication node, an update periodicity of a slot state table, wherein the update periodicity comprises x consecutive slots, wherein x is an integer no less than 1 and no more than a total number of slots comprised in a frame; and
   updating, by the communication node, the slot state table at an end of each update periodicity;
   wherein the communication node is one of a plurality of communication nodes exchanging information in a distributed manner in a distributed communication system.

2. The method according to claim 1, wherein after the communication node updates the slot state table at the end of each update periodicity, the method further comprises:
   detecting collision between slots.

3. The method according to claim 1, wherein determining, by the communication node, the update periodicity of the slot state table comprises:
   determining, by the communication node, the update periodicity of the slot state table according to configuration information of a system; or
   obtaining, by the communication node, at least one of current processing capacity information in each slot of the system, a buffer area size, service delay requirement information, and collision detection delay requirement information, and determining the update periodicity of the slot state table according to the obtained information.

4. The method according to claim 1, wherein the method further comprises:
   buffering, by the communication node, Frame Information, FI, received in the slots in each update periodicity, and information about the slots where the FI is located; and
   updating, by the communication node, the slot state table at the end of each update periodicity comprises:
   inputting, by the communication node, the respective FI received in the slots in each update periodicity, and the information about the slots where the FI is located to an iterative state update algorithm sequentially in an order that they are received, at the end of the update periodicity, and updating the slot state table in the iterative state update algorithm.

5. The method according to claim 1, wherein the method further comprises:
   Presetting, by the communication node, a temporary slot state table, and initializing the temporary slot state table at a beginning of each update periodicity; and receiving Frame Information, FI, in the slots in each update periodicity, inputting the FI, and information about the slots where the FI is located to an iterative state update algorithm, and updating the temporary slot state table in the iterative state update algorithm; and
   updating, by the communication node, the slot state table at the end of each update periodicity comprises:
   mapping, by the communication node, a current temporary slot state table to virtual FI under a preset mapping rule at the end of each update periodicity, inputting the virtual FI to an iterative state update algorithm, and updating the slot state table in the iterative state update algorithm.

6. The method according to claim 5, wherein the mapping rule comprises
   a slot state of being self-occupied in the temporary slot state table is mapped to a virtual FI slot state of being self-occupied in a non-detection filed;
   a slot state of being one-hop neighboring in the temporary slot state table is mapped to a virtual FI slot state of being self-occupied in a detection field;
   a slot state of being two-hop neighboring in the temporary slot state table is mapped to a virtual FI slot state of being self-occupied in a non-detection field;
   a slot state of being three-hop neighboring in the temporary slot state table is mapped to a virtual FI slot state of being two-hop neighboring;
   a slot state of being idle in the temporary slot state table is mapped to a virtual FI slot state of being idle; and
   a slot state of collision in the temporary slot state table is mapped to a virtual FI slot state of collision.

7. The method according to claim 1, wherein the method further comprises:
   buffering, by the communication node, Frame Information, FI, received in the slots in each update periodicity, and information about the slots where the FI is located; and
   updating, by the communication node, the slot state table at the end of each update periodicity comprises:
   combining, by the communication node, the buffered respective FI received in the slots in each update periodicity into a piece of special FI under an FI combination rule in a cumulative state update algorithm at the end of the update periodicity; and
   inputting the special FI to an iterative state update algorithm, and updating the slot state table in the iterative state update algorithm.

8. A communication device, comprising:
   a processor and a memory, wherein the memory stores one or more computer readable program codes, and the processor is configured to execute the computer readable program codes, to
   determine an update periodicity of a slot state table, wherein the update periodicity comprises x consecutive slots, wherein x is an integer no less than 1 and no more than a total number of slots comprised in a frame; and
   update the slot state table at an end of each update periodicity;

wherein the communication device is one of a plurality of communication devices exchanging information in a distributed manner in a distributed communication system.

9. The communication device according to claim 8, wherein the processor is further configured to detect collision between slots after the slot state table is updated at the end of each update periodicity.

10. The communication device according to claim 8, wherein the processor is further configured:
   to determine the update periodicity of the slot state table according to configuration information of a system; or
   to obtain at least one of current processing capacity information in each slot of the system, a buffer area size, service delay requirement information, and collision detection delay requirement information, and to determine the update periodicity of the slot state table according to the obtained information.

11. The communication device according to claim 8, wherein
   the memory is further configured to buffer Frame Information, FI, received in the slots in each update periodicity, and information about the slots where the FI is located; and
   the processor is further configured:
   to input the respective FI received in the slots in each update periodicity, and the information about the slots where the FI is located to an iterative state update algorithm sequentially in an order that they are received, at the end of the update periodicity, and to update the slot state table in the iterative state update algorithm.

12. The communication device according to claim 8, wherein the processor is further configured:
   to initialize a preset temporary slot state table at a beginning of each update periodicity; and to receive Frame Information, FI, in the slots in each update periodicity, to input the FI, and information about the slots where the FI is located to an iterative state update algorithm, and to update the temporary slot state table in the iterative state update algorithm; and
   to map the current temporary slot state table to virtual FI under a preset mapping rule at the end of each update periodicity, to input the virtual FI to an iterative state update algorithm, and to update the slot state table in the iterative state update algorithm.

13. The communication device according to claim 12, wherein the mapping rule comprises:
   a slot state of being self-occupied in the temporary slot state table is mapped to a virtual FI slot state of being self-occupied in a non-detection unit;
   a slot state of being one-hop neighboring in the temporary slot state table is mapped to a virtual FI slot state of being self-occupied in a detection unit;
   a slot state of being two-hop neighboring in the temporary slot state table is mapped to a virtual FI slot state of being self-occupied in a non-detection unit;
   a slot state of being three-hop neighboring in the temporary slot state table is mapped to a virtual FI slot state of being two-hop neighboring;
   a slot state of being idle in the temporary slot state table is mapped to a virtual FI slot state of being idle; and
   a slot state of collision in the temporary slot state table is mapped to a virtual FI slot state of collision.

14. The communication device according to claim 8, wherein
   the memory is further configured to buffer Frame Information, FI, received in the slots in each update periodicity, and information about the slots where the FI is located; and
   the processor is configured:
   to combine the buffered respective FI received in the slots in each update periodicity into a piece of special FI under an FI combination rule in a cumulative state update algorithm at the end of the update periodicity; and
   to input the special FI to an iterative state update algorithm, and to update the slot state table in the iterative state update algorithm.

\* \* \* \* \*